US011025505B2

(12) United States Patent
Lew et al.

(10) Patent No.: US 11,025,505 B2
(45) Date of Patent: Jun. 1, 2021

(54) DYNAMIC SELECTION OF CHANNELS FOR INCOMING COMMUNICATION

(71) Applicant: salesforce.com, inc., San Francisco, CA (US)

(72) Inventors: Eugene Lew, San Francisco, CA (US); Mohit Aggarwal, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/596,078

(22) Filed: Oct. 8, 2019

(65) Prior Publication Data

US 2020/0252303 A1 Aug. 6, 2020

Related U.S. Application Data

(63) Continuation of application No. 15/421,230, filed on Jan. 31, 2017, now Pat. No. 10,439,895.

(51) Int. Cl.
| | |
|---|---|
| *H04L 12/707* | (2013.01) |
| *H04L 12/24* | (2006.01) |
| *H04L 12/58* | (2006.01) |
| *H04L 29/08* | (2006.01) |

(52) U.S. Cl.
CPC .............. *H04L 41/22* (2013.01); *H04L 51/14* (2013.01); *H04L 51/20* (2013.01); *H04L 67/325* (2013.01)

(58) Field of Classification Search
CPC ...................................................... H04L 41/22
USPC ......................................................... 709/203
See application file for complete search history.

(56) References Cited

U.S. PATENT DOCUMENTS

| | | | | |
|---|---|---|---|---|
| 5,608,786 | A  * | 3/1997 | Gordon | G06Q 10/107 358/402 |
| 6,493,695 | B1 * | 12/2002 | Pickering | H04M 3/5183 706/45 |
| 6,903,755 | B1 | 6/2005 | Pugaczewski et al. | |
| 6,999,565 | B1 * | 2/2006 | Delaney | G06Q 10/107 379/67.1 |

(Continued)

OTHER PUBLICATIONS

Merriam-Webster, "preference", 2020 (Year: 2020).*

(Continued)

*Primary Examiner* — Ondrej C Vostal

(74) *Attorney, Agent, or Firm* — Sterne, Kessler, Goldstein & Fox P.L.L.C.

(57) ABSTRACT

The technology disclosed for configuring a transcoder-router to direct incoming communications to desired receivers includes receiving a selection by a user from an icon-based GUI, of an incoming voice, video, image, short message, or email media type to configure for routing. Incoming communications gets routed in the context of the incoming media type, with the transducer-router receiving a combination of routing conditions with which to determine the routing of the incoming media type: a time zone against which routing schedules are measured; a time window for the routing schedules that covers both time of day and day of week; and available receiver devices for the routing under the selected combination of the incoming media type, time zone and time window. The disclosed systems and methods include committing routing rules based on the user selections to tangible machine readable memory; and using the committed rules to route incoming media type messages.

20 Claims, 8 Drawing Sheets

(56) References Cited

U.S. PATENT DOCUMENTS

| | | | |
|---|---|---|---|
| 7,117,259 B1* | 10/2006 | Rohwer | H04L 65/4069 709/223 |
| 7,149,975 B1* | 12/2006 | Johnson | H04L 41/22 715/734 |
| 8,316,128 B2 | 11/2012 | Beck et al. | |
| 8,554,940 B2* | 10/2013 | Jennings | H04L 65/60 709/231 |
| 9,288,165 B1* | 3/2016 | Stovall | G06Q 10/107 |
| 10,796,236 B2* | 10/2020 | Jones | G06F 16/3344 |
| 2001/0040887 A1 | 11/2001 | Shtivelman et al. | |
| 2004/0141508 A1 | 7/2004 | Schoeneberger et al. | |
| 2007/0038703 A1 | 2/2007 | Tendjoukian et al. | |
| 2007/0079274 A1* | 4/2007 | Tetelbaum | G06F 30/398 716/130 |
| 2007/0168228 A1* | 7/2007 | Lawless | G06Q 50/24 705/2 |
| 2007/0208498 A1 | 9/2007 | Barker et al. | |
| 2008/0002820 A1* | 1/2008 | Shtiegman | H04L 29/06027 379/211.02 |
| 2008/0043969 A1* | 2/2008 | Shi | H04M 3/42263 379/211.02 |
| 2008/0215694 A1* | 9/2008 | Chen | H04L 51/36 709/206 |
| 2008/0290987 A1* | 11/2008 | Li | G06Q 30/02 340/5.1 |
| 2009/0239504 A1* | 9/2009 | Turk | H04L 51/12 455/412.1 |
| 2011/0029616 A1* | 2/2011 | Wang | G06Q 10/107 709/206 |
| 2011/0167058 A1 | 7/2011 | Van Os | |
| 2012/0254220 A1* | 10/2012 | Verthein | G06F 16/24 707/769 |
| 2014/0079207 A1* | 3/2014 | Zhakov | H04M 3/5175 379/265.03 |
| 2014/0214967 A1* | 7/2014 | Baba | H04H 60/13 709/205 |
| 2014/0309806 A1 | 10/2014 | Ricci | |
| 2014/0309870 A1 | 10/2014 | Ricci | |
| 2015/0029837 A1* | 1/2015 | Ashwood-Smith | H04L 45/34 370/228 |
| 2016/0234686 A1* | 8/2016 | Bone | H04L 9/0861 |
| 2016/0308958 A1 | 10/2016 | Navali et al. | |
| 2017/0099248 A1* | 4/2017 | Pisenti | H04L 51/10 |

OTHER PUBLICATIONS

Parker et al., "Unified Messaging—A Value-Creating Engine for Next-Generation Network Services", 1999 (Year: 1999).*

Merriam-Webster, "particular" (2019).

* cited by examiner

Name, User ID or Email Address: Ruth Bader Ginsberg

Media Types 312

Time Zone 322  Default to Geolocation 328

Time Schedule 352 (Current Time Zone 354 / Planned Time Zone 356)

Start  Stop  ...  Start  Stop

Device Types 362

Communication Preference Priority 372
Voice _____  Desk _____
Video _____  Mobile _____
Data _____

FIG. 3

Name, User ID or Email Address: Ruth Bader Ginsberg

Media Types 412

Caller Class 422

Friends _____

Business Associate _____

Prospects _____

Solicitors (likely) _____

Unknown _____

Add new class _____

Device Types 452

Time Schedule 462 (Current Time Zone / Planned Time Zone)

Start  Stop  ...  Start  Stop

FIG. 4

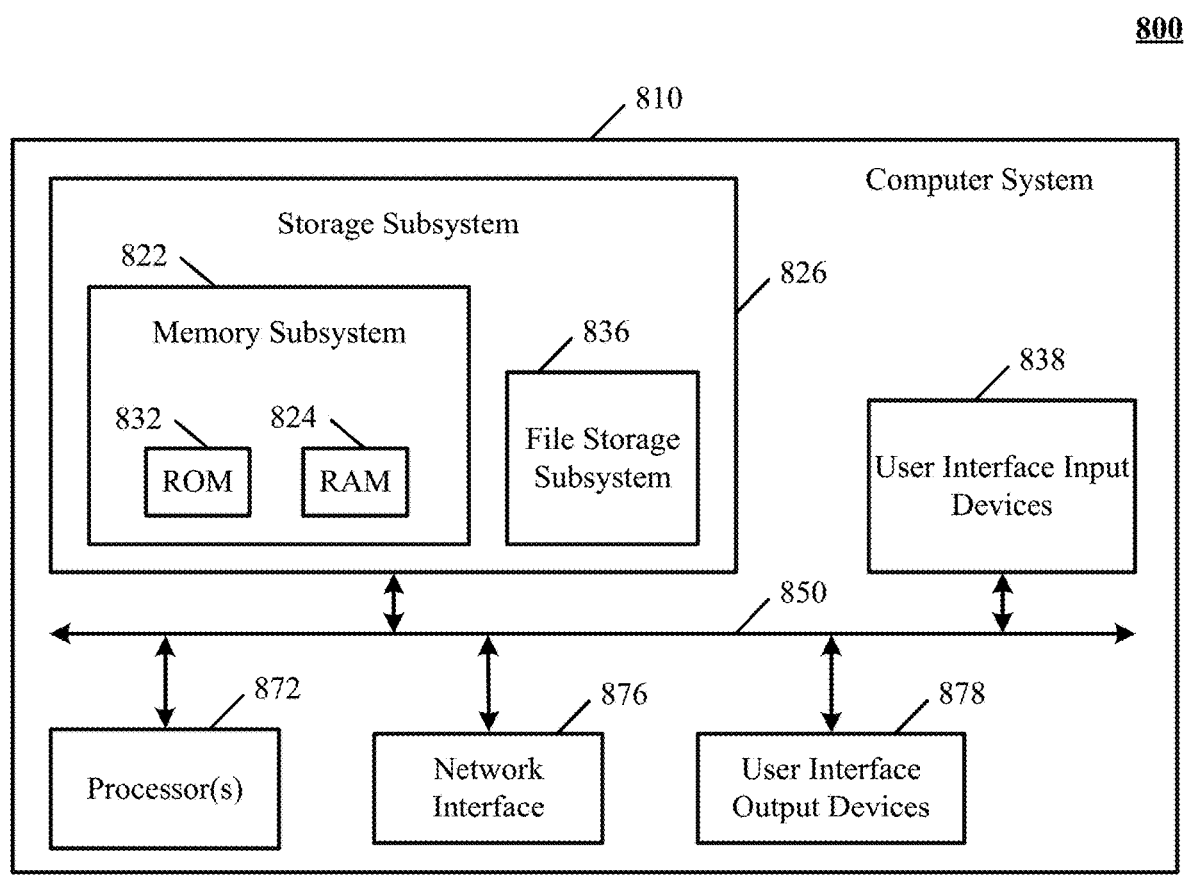
FIG. 8 Computer System

DYNAMIC SELECTION OF CHANNELS FOR INCOMING COMMUNICATION

FIELD OF DISCLOSURE

The technology disclosed describes systems and methods for dynamically selecting channels for routing incoming communication, after configuring a transcoder-router to direct incoming communications to the desired receivers.

The methods disclosed include managing digital data for a plurality of tenants to software instances, each tenant of the plurality of tenants comprising a group of users who share a common access with a specific set of privileges to a software instance of at least one application.

INTRODUCTION

Individuals and businesses often utilize multiple modes of communications and devices in today's world, including multiple phone numbers, email addresses, and other modes of access such as Skype, Viber, WhatsApp, Facebook Messenger and other social media connection points. Service for a device may be unavailable at any point in time due to power outages or the device may be geographically positioned in physical locations with network constraints, such as the availability of WiFi or cell phone service networks. These scenarios and constraints lead to the following observations about business and personal communications.

Some communication channels through which a person can be reached are unavailable at times, and are susceptible to change with time and location. Communication channels are susceptible to being eliminated, as is the case when a user changes their phone number or email address. These limitations impose challenges for people who wish to contact a user. It is necessary to remember some or all of the communication channels for the individuals you wish to contact, including phone numbers, email addresses and user ids, and ambiguity exists as to which channel to use to contact someone at a specific time of day. An individual may want to allow some people such as their parents to reach them on multiple devices, based on the person's relationship to the individual or the urgency of a situation. These communication issues are exacerbated for non-tech-savvy people. For those people, an email invitation can include a link through which the user can configure their contacts. Once Dad joins the individual's network, he can make calls and send messages with no need for knowledge of multiple phone numbers for their son or daughter.

An opportunity arises to improve communication capabilities between senders and receivers by providing systems and methods for dynamically selecting channels for delivery of incoming communications.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

Disclosed systems and methods are described for configuring a transcoder-router to direct incoming communications to desired receivers. This configuring includes receiving a selection by a user from an icon-based GUI, of an incoming media type to configure for routing, for incoming media types of voice, video, image, short message, and email; and in the context of the selected incoming media type, receiving a selection, by the user, of a combination of routing conditions with which to determine the routing of the selected incoming media type. Routing conditions include a selection, by the user from a map-based GUI, of a time zone against which routing schedules are measured; a selection, by the user from a clock and calendar-based GUI, of a time window for the routing schedules that covers both time of day and day of week; a selection, by the user from an icon-based GUI, of receiver devices for the routing under the selected combination of the incoming media type, time zone and time window. The disclosed methods include repeatedly receiving user selections of the incoming media type, time zone, time window and receiver devices, and committing routing rules based on the user selections to tangible machine readable memory; and using the committed rules to route incoming media type messages based on the selected combinations of the incoming media type, time zone, time window and receiver devices. A message of the incoming media type gets transcoded to be compatible with the selected receiver device and the specified software application.

A disclosed method includes checking new routing rules against prior routing rules for inconsistencies and generating a rule conflict message for any inconsistencies revealed. Also included is a method of receiving a selection, by a user from a list of caller classes, of a caller class as a context for the combinations of the incoming media type, time zone, time window and receiver devices; and combining the selected caller class with the selected incoming media type as the context for processing the combination of routing conditions. Friends, business associates and unknown callers are among the list of caller classes available for user selection. Additional sub-classes can be set up by a user, such as customers, co-workers, work friends, outside friends and family.

For users who travel, communication preferences are configurable for time zones during a scheduled interval or when geolocation sensing matches the selected time zone. A user can also specify a particular software application running on the selected receiver device to which the selected incoming media type are to be routed under a selected combination of conditions.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 3 shows an example icon-based GUI for configuring a transcoder router to direct incoming communication to desired receivers.

FIG. 4 shows an additional window of the example icon-based GUI, through which a sender or a receiver can set up a caller class.

FIG. 8 is a block diagram of an example computer system for configuring a transcoder router to direct communications to desired receivers.

DETAILED DESCRIPTION

Figure 1:
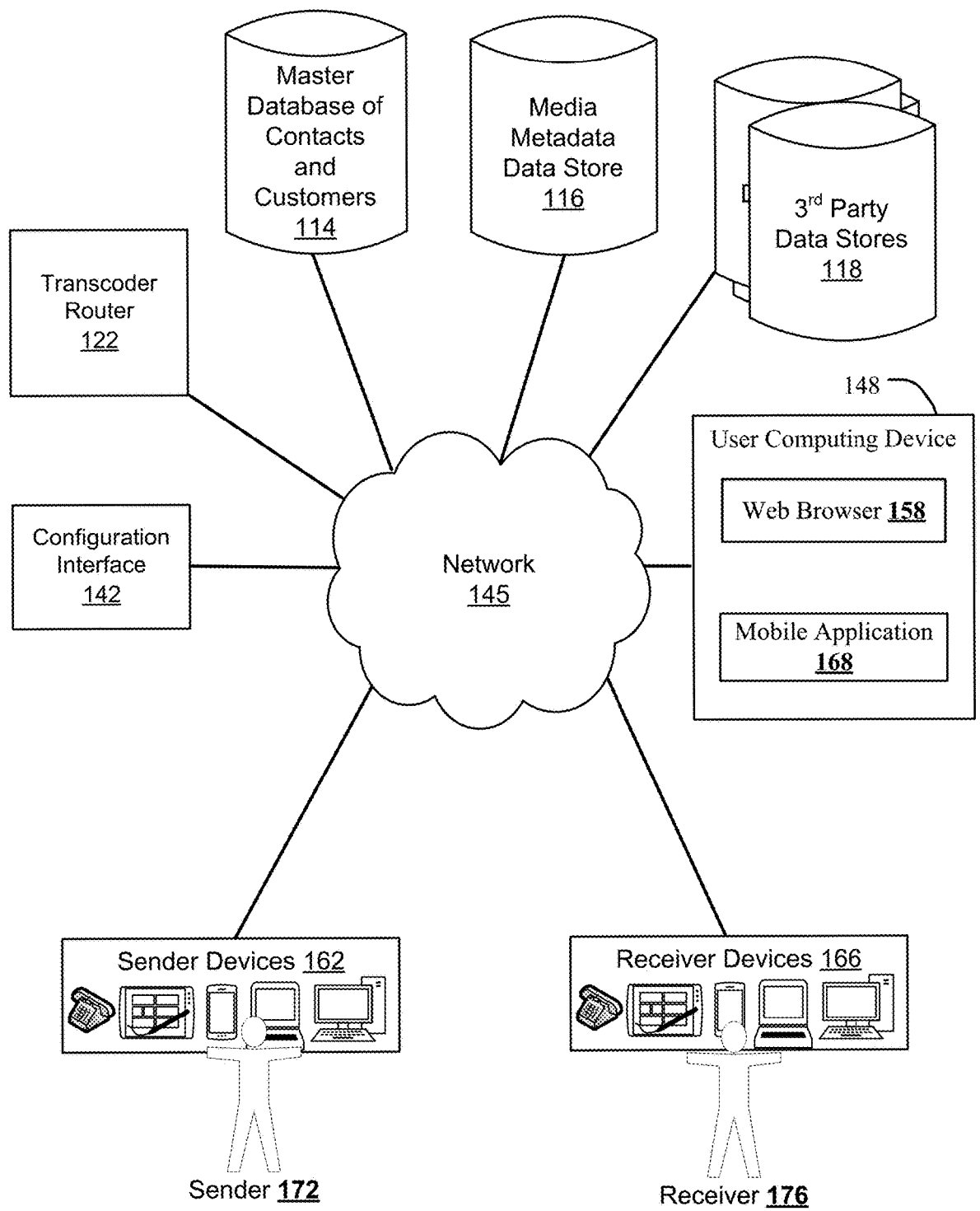
FIG. 1 illustrates one example implementation of configuring a transcoder router to direct communications to desired receivers, in an environment for dynamic selection of channels for incoming communications.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Both business users and individual personal users encounter a range of needs for communication throughout their day. In one situation, users need to receive calls at a single location—controlling calls from a client by mapping calls that arrive on a mobile voice network, such as via cell phone or work phone line, and on a mobile data network such as a web interface, to a single entry point that is configured based on the needs of the user. In some situations, a business user wants to prioritize a short list of expected calls they need to receive directly, instead of shunting the incoming calls to an assistant for handling.

For some users, their contact information changes as they travel across time zones domestically and internationally, for both business and pleasure. Individual A need not remember any of recipient user B's contact details, and user B does not need to provide updates about their geographic location or communication limitations to those who want to communicate with them during their trips, when they utilize the disclosed technology for dynamic selection of channels for incoming communication. When user B travels to different countries in which they use different phone numbers or email addresses, for example, nothing changes for individual A, who can use a web interface, or a mobile phone or tablet application interface to contact user B. User B can configure various communication channels to reflect the currently-available, preferred options, as described later in detailed used case examples.

In one case, for an enterprise collaboration software platform such as Salesforce Chatter, customers interact differently with email than with short message service (SMS), so a customer can modify an enterprise-provided default configuration in which emails are automatically placed into a pre-configured chat stream, deciding whether to put a specific communiqué into Chatter or email. In one example, a filter can be configured to enable multiple email attachments to be included in a single Chatter post. In another case, a customer can configure desired channels for sending and receiving communication via a short message service (SMS) such as Twitter, mapping tweets with specific hashtags into pre-configured email digests or sending text messages to pre-designated devices.

Considerations for communication between a sender's device and a receiver's device include resolution of files and the types of media that a device can digest. A powerful desktop PC has an extremely powerful processor and thus can process high-resolution files with ease, can play a broad array of media encodings (H.264, VC-9, WMV, etc.), and is usually attached to a high-resolution display. By contrast, mobile devices often have a low powered, power efficient processor that is not capable of processing high-resolution files smoothly. Mobile devices have a restricted set of media types they can play back (H.264), and have a small, lower-resolution integrated display. Because of these differences between desktop PCs and mobile devices, ideally, the media needs to be sent in the ideal resolution, with the correct media encoding (H.264, etc.), and with a compatible file container. Other considerations when routing a sender's communication to a recipient include application constraints. For example, Facebook has graphic capabilities and more character capacity than SMS. It is desirable to track incoming messages and match the ability of received message when responding, such as resolution possibilities. In one scenario, for live audio, a sender needs to consider the capabilities based on the device type of recipient. Any media type, including voice, video, image, SMS and email can be sent and received over a channel matching in capability. An environment for dynamic selection of channels for incoming communication is described next.

Environment

FIG. 1 illustrates an example environment 100 for dynamic selection of channels for incoming communication. Environment 100 includes a transcoder router 122 for directing incoming communications from incoming message receiver 152 to desired receivers. A customer or other user sends a message via one of a selection of sender devices 162, including a laptop or desktop computer, a smart phone or tablet, or a land line telephone system, or another user device configured to enable voice, video, image or data communication. Environment 100 also includes an incoming message receiver 152 which transmits the communicated information from the sender to transcoder router 122 which identifies the sender, detects the device used for the transmission, determines the media type of the transmission, and determines how to route the transmitted communication, as described in detail infra. Transcoder router 122 also converts the language and information from one form of coded representation to another—acting as a universal translator that determines what types of file and format a particular client can handle and translating the sender's media into that format.

Environment 100 includes a master database of contacts and customers 114 that includes a long-term record of contact details for users, and media metadata data store 116 that stores metadata of received communication. Additionally included in environment 100 are $3^{rd}$ party data stores 118: in one case, a Global Scheduling Multiple Access International Mobile Equipment Identity (GSMA IMEI) database that stores the serial numbers of every mobile network capable device in the world, along with the device's hardware configuration and software base. $3^{rd}$ party data stores 118 also includes a dictionary database of specific languages, and a Facebook user directory for a specific person's profile data, or a similar WhatsApp user directory.

Header metadata in messages is extensive and can be harvested. Master database of contacts and customers 114 and media metadata data store 116 get updated based on the results of received messages from incoming message receiver 152. This automated updating can alleviate the need to update contacts when contact info changes. Stored metadata is usable by transcoder router 122 for determining routing of later-in-time messages, as described in more detail infra.

Environment 100, for dynamic selection of channels for incoming communication, also includes configuration interface 142 that provides an icon-based GUI usable by senders and receivers to select time zones, routing schedules, media types and device options, as described infra. User computing device 148 is usable for accessing the configuration interface 142 of dynamic selection of channels for incoming communication environment 100, which includes a web browser 158 and/or a mobile application 168. User computing device 148 can be a personal computer, laptop computer, tablet computer, smartphone, personal digital assistant (PDA), digital image capture devices, and the like.

In some implementations, the modules of environment 100 can be of varying types including workstations, servers, computing clusters, blade servers, server farms, or any other data processing systems or computing devices. Modules can be communicably coupled to the data store via a different network connection. For example, master database of contact and customers 114 and transcoder router 122 can be coupled via the network 145 (e.g., the Internet) and configuration interface 142 can be coupled to a direct network link and can additionally be coupled via a direct link to media metadata data store 116 and $3^{rd}$ party data stores 118. In some implementations, user computing device 148 may be connected via WiFi.

In some implementations, network(s) 145 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

In other implementations, environment 100 may not have the same elements as those listed above and/or may have other/different elements instead of, or in addition to, those listed above.

The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Figure 2:
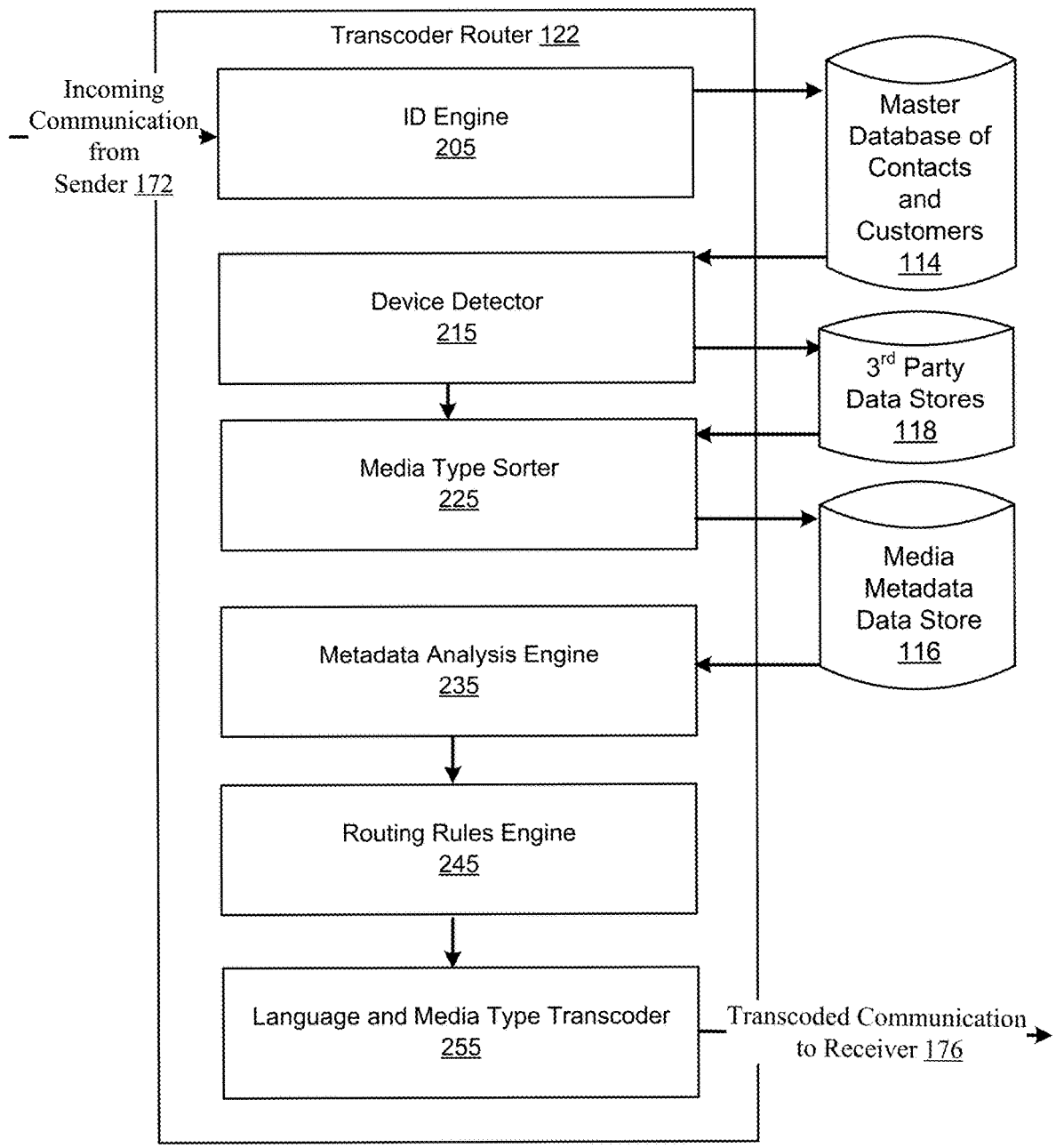
FIG. 2 shows an example block diagram for a transcoder router.

FIG. 2 shows a block diagram of transcoder router 122, with an incoming communication to ID engine 205 which identifies a sender 172 in conjunction with master database of contacts and customers 114. Device detector 215 distinguishes which device the sender 172 utilized in their communication. Detected devices can include any of a laptop or desktop computer, a smart phone or tablet, or a land line telephone system, or another user device configured to enable voice, video, image or data communication. In cases in which the user has specified default to geolocation 328 for a device, as described later, the current geolocation is also detected and communicated. When a sender uses the application of an enterprise platform, the incoming server recognizes the sender's caller ID, their email address or other protocol ID. For cases in which the device is not recognized by the enterprise platform server, device detector 215 refers to $3^{rd}$ party data stores 118 to identify the device and sender profiles.

Transcoder router 122 also includes media type sorter 225 for determining whether the communication is voice, video, image or data—such as an image, SMS or email. Media metadata data store 116 caches the identity, device type and media type information of the sender, and the sensed geolocation if available, for future reference. Media metadata data store 116 also serves as an archive of metadata for previous messages. Transcoder router 122 further includes metadata analysis engine 235 that compares current ID, device type and media type to metadata from recent communications by the sender, to the receiver, if available, and provides resultant ID, device type and media type to rules routing engine 245. In one example, the metadata can include the device capabilities such as graphics and video resolution available to the receiver—including color palette of the receiver 176, and which the language and media type transcoder 255 utilizes for transcoding the communication for the receiver 176. Reply messages can also include images and channel ties that mimic those received from the sender.

Transcoder router 122 also includes routing rules engine 245 that utilizes a set of rules to specify communication channel selection, compiled based on default settings. Routing rules engine 245 also checks new routing rules against prior routing rules for inconsistencies and generates a rule conflict message for any inconsistencies revealed. One example rule specifies the default configuration of sending a message with the same resolution and device capabilities, using the same media type as the sender used. In one example, a Facebook message would be sent to the receiver as a Facebook message. In another example, a voice call would be communicated to the receiver as a voice call.

A sender can override the default rules by customizing their preferences via an icon-based GUI, described in detail infra. A plethora of customizations for a sender and for a receiver are available via the GUI, including time zones for both their home location and any current or planned travel, and time schedules for same, as described infra. In one example, a sender can elect to receive all of their incoming text messages as SMS on WhatsApp or Viper when they are traveling internationally. Configuration can also be updated by the user when they travel and use an alternative subscriber identity module SIM memory chip in their device(s) or use a different device altogether.

Further, transcoder router 122 includes language and media type transcoder 255 for transcoding a message of the incoming media type to be compatible with the selected receiver device.

FIG. 3 shows an example icon-based GUI, accessible via user computing device 148 web browser 158 or mobile application 168, for configuring transcoder router 122 to direct incoming communication to desired receivers. The name, user ID or email address 314 has been utilized, in this example, to authenticate the configuring user, Ruth Bader Ginsberg. The user selects one or more incoming media types 312 to configure for routing—for incoming media types of voice, video, image, short message, and/or email. The user can select, in the context of selected incoming media type, a combination of routing conditions for use to determine the routing of communications from the selected incoming media type.

In some implementations, a user's location and time zone are auto-detected, and the user can override the detected location and time zone globally, manually setting a location and time zone. Continuing with FIG. 3, for time zone 322, the user can select a time zone against which routing schedules are generated. In some cases, the user may select an option to default to geolocation 328. In this case, routing rules engine 245 will utilize the sensed geolocation to determine the current time zone, in lieu of a map location selected by the user. The user selects a time schedule 352 from a clock and calendar-based GUI: a time window for the routing schedules that covers both time of day and day of week, for the selected media type and device type 362. Two active times can be selected—one for a current time zone 354 and another for a planned time zone 356. In some implementations, the user can use a tool tip menu of the time zone GUI to specify that the selected time zone applies as home-default during a scheduled interval, or when geolocation sensing matches the selected time zone. For some implementations of the time window GUI, time schedule 352 can include a multi-select plurality of time windows that are all treated alike for routing of the selected incoming media type under the selected combination of conditions. In one example use case, an enterprise needs to ensure that senders do not receive a return message on certain days or at certain times, such as at 3 am their local time. A default configuration can be set up with do not deliver (DND) time zones specified relative to the customers' time zone requirements for not sending messages, as specified in the master database of contacts and customers 114.

Also in FIG. 3, the user selects receiver device types 362 for the routing under the selected combination of the incoming media type, time zone and time window. In one case, for example, a user traveling in India may have access to only their smart phone and laptop, but not their desktop computer or a land line telephone. Users can utilize a tool tip menu of the receiver device types 362 GUI to specify a particular account for the selected receiver device type to which the selected incoming media types are to be routed under the selected combination of conditions. Communication preference priority 372 can also be configured by the user, to provide the preferred priority to routing rules engine 245. When configuration preferences are set, the user can save 318 the customized routing rules for use by routing rules engine 245.

Routing rules engine 245 can utilize a decision tree to determine the best match between a sender's communication and the recipient's available media types 312 and device types 362. When a sender's communication is incompatible with the recipient's device types 362 and media types 312, the system can generate an error message.

The disclosed method of configuring a transcoder-router to direct incoming communication to desired receivers makes it more viable to prioritize traffic during a work day, by setting up caller classes for key relationships, such as spouses and children, and for important incoming calls. FIG. 4 shows an additional window of the GUI, through which a user such as Ruth Bader Ginsberg 414—a sender or a receiver—can set up a caller class 422 for friends, business associates, prospects, solicitors (likely) and/or unknown communication attempts. Access can be directed to specific device types 452 based on a selected time schedule 462 for specific media types 412 of voice (calls), video, SMS, email or images. Additional other caller classes can be configured, as well. The user selects save 418 to store their configuration and rules for future access.

The disclosed system can include using a user computing device 148 to login to a web browser 158 or to a mobile application 168 for configuring the routing controller for sending and receiving communications. In one implementation, a plugin can be utilized to import thousands of bulk contacts and a default configuration can be set up for the contacts.

Figure 5:
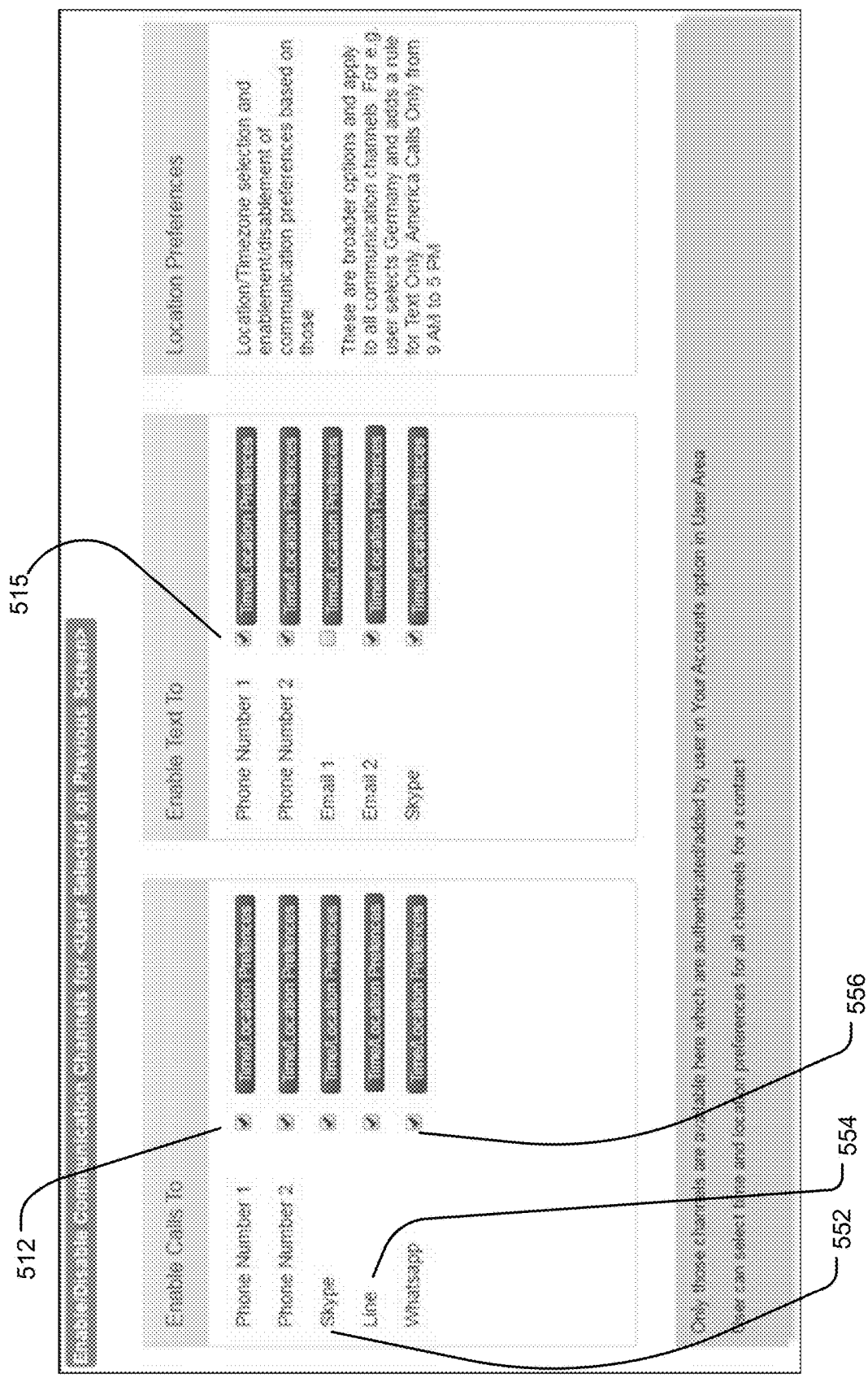
FIG. 5 shows an alternative GUI for enabling and disabling communication channels for a user.

FIG. 5 shows an alternative GUI 500 for enabling and disabling communication channels for a user. Channels are authenticated and added by the user prior to being presented in this GUI as available for configuration. In the alternative GUI interface, users can add or remove their phone numbers, email addresses and other communication channels personal to them. Phone numbers and email addresses get validated and communication gets authenticated by the individual platform selected for delivery of the communication. In the example case, the user can enable calls to specific phone numbers 512, to a particular software application running on the selected receiver device to which the selected incoming media type are to be routed under the selected combination of conditions, such as Skype 552 or WhatsApp 556, or to a land line 554. Similarly, texts can be enabled to a choice of phone numbers, a choice of two emails or to Skype 515. Location and time zone selection enablement and disablement for communication are based on the device types and the applications specified. Broader options can be applied for all communication channels, and times can be customized for each number individually. In some cases, a user can add a contact by looking up a phone number or email of a registered user or by initiating a name search across channels they utilize such as Skype or Facebook, and then sending a "friend request". Users can opt out of being publicly accessible on some applications, such as by using the Skype status of 'invisible'. Adding a contact on a communication channel application such as Skype does not add the contact to the transcoder router for directing incoming communication to desired receivers, or to the master database of contacts and customers 114.

Figure 6:
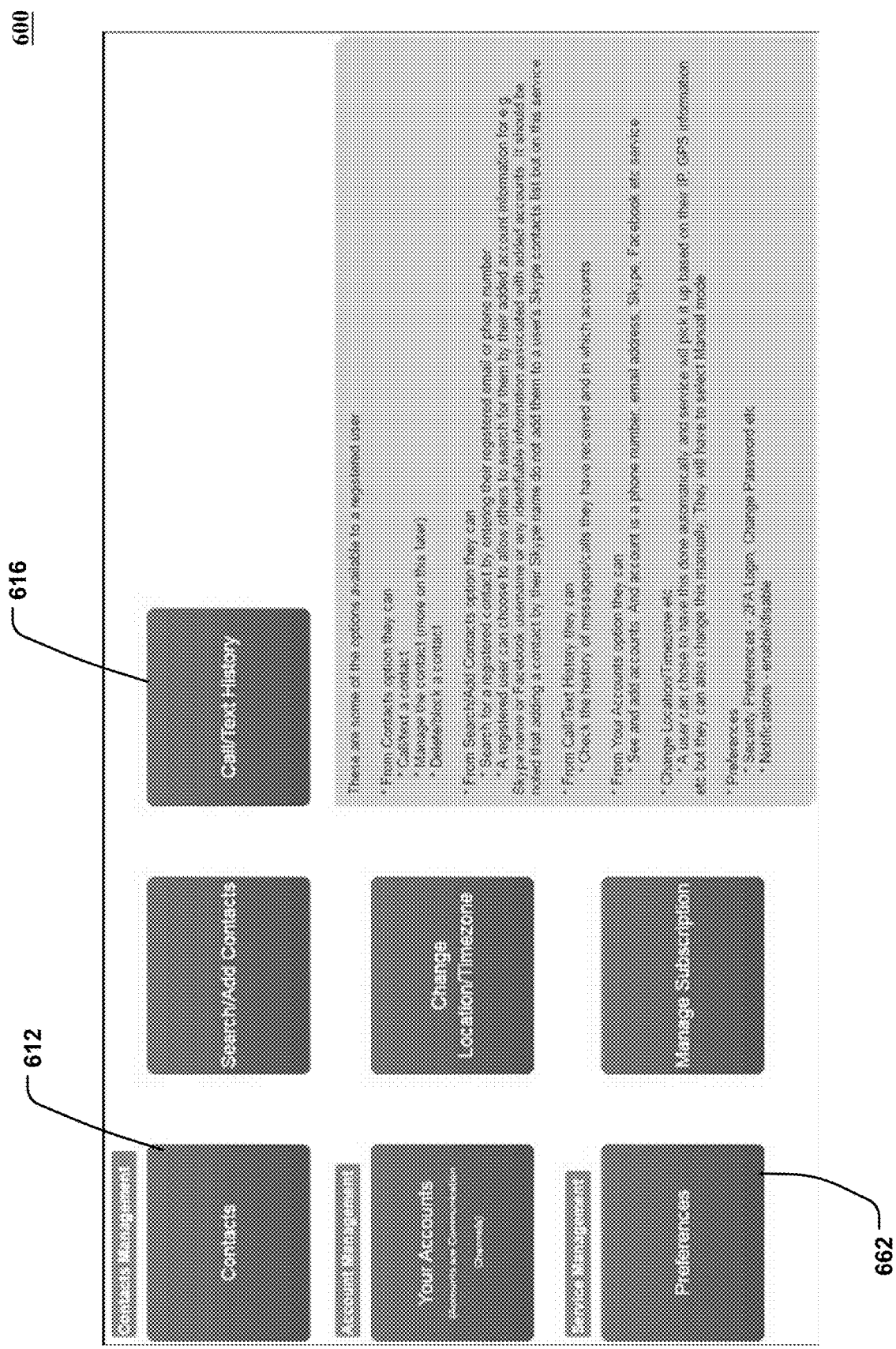
FIG. 6 shows a second screen of an alternative GUI for enabling and disabling communication channels for a user.

FIG. 6 shows alternative GUI 600 options for enabling and disabling communication channels for a user. Registered users can call or text a contact 612 via the interface and can delete or block a contact. Additionally the user can review a log of the history 616 of messages and calls that they have sent and received. Security preferences 662 can be customized to match the needs of an enterprise and notifications can be configured to enable and disable notifications, on an as-needed basis.

In one use case of the disclosed technology, senders are able accommodate specific needs of their recipients when an enterprise broadcasts a 'system upgrade' message to their customers. Customers (recipients) earlier used time schedule 352 to set a work hours schedule and time zone 322 to specify their time zone. The sender configures their email media profile, to send only during the business hours of the recipients, based on the recipients' profiles, stored in master database of contacts and customers 114. The sender indirectly references the usable hours by constraining the email to "work hours".

In another use case, a businesswoman configures their profile preferences to default to receive the same media types 312 on the same device types 362 during business hours, as configured using time schedule 352, when on the same continent as the sender. When the businesswoman schedules travel to other continents for temporary stays, they set up their home default using a tool tip menu of the time zone GUI to specify that the selected time zone applies as home-default during a scheduled interval, and for away from home when sensed geolocation matches. She adds an alternate phone number via a tool tip menu and configures SMS media type 312 to WhatsApp via a tool tip menu application on the GUI. She selects an option to adjust the rules for routing rules engine 245 for date and time to accommodate the business hours in her "current time zone 354" to match the local "planned time zone 356".

In a third use case, from an automated recipient perspective, users configure their communication profiles for media types 312 to channel emails received via a software platform to be automatically placed into a pre-configured chat stream; and they configure the interface to enable individuals to decide whether to put a specific communiqué into Chatter or email. That is, for an enterprise collaboration software platform such as Salesforce Chatter, customers interact differently with email than with SMS, so a customer can modify an enterprise-provided default configuration in which emails are automatically placed into a pre-configured chat stream, deciding whether to put a specific communiqué into Chatter or email. In one example, a tool tip menu filter can be configured to enable multiple email attachments to be included in a single Chatter post. In another case, a customer can configure desired channels for sending and receiving communication via a short message service (SMS) such as Twitter, mapping tweets with specific hashtags into pre-configured email digests or sending text messages to pre-designated devices. We describe an example workflow for configuring a transcoder-router to direct incoming communications with desired receivers next.

Workflow

Figure 7:
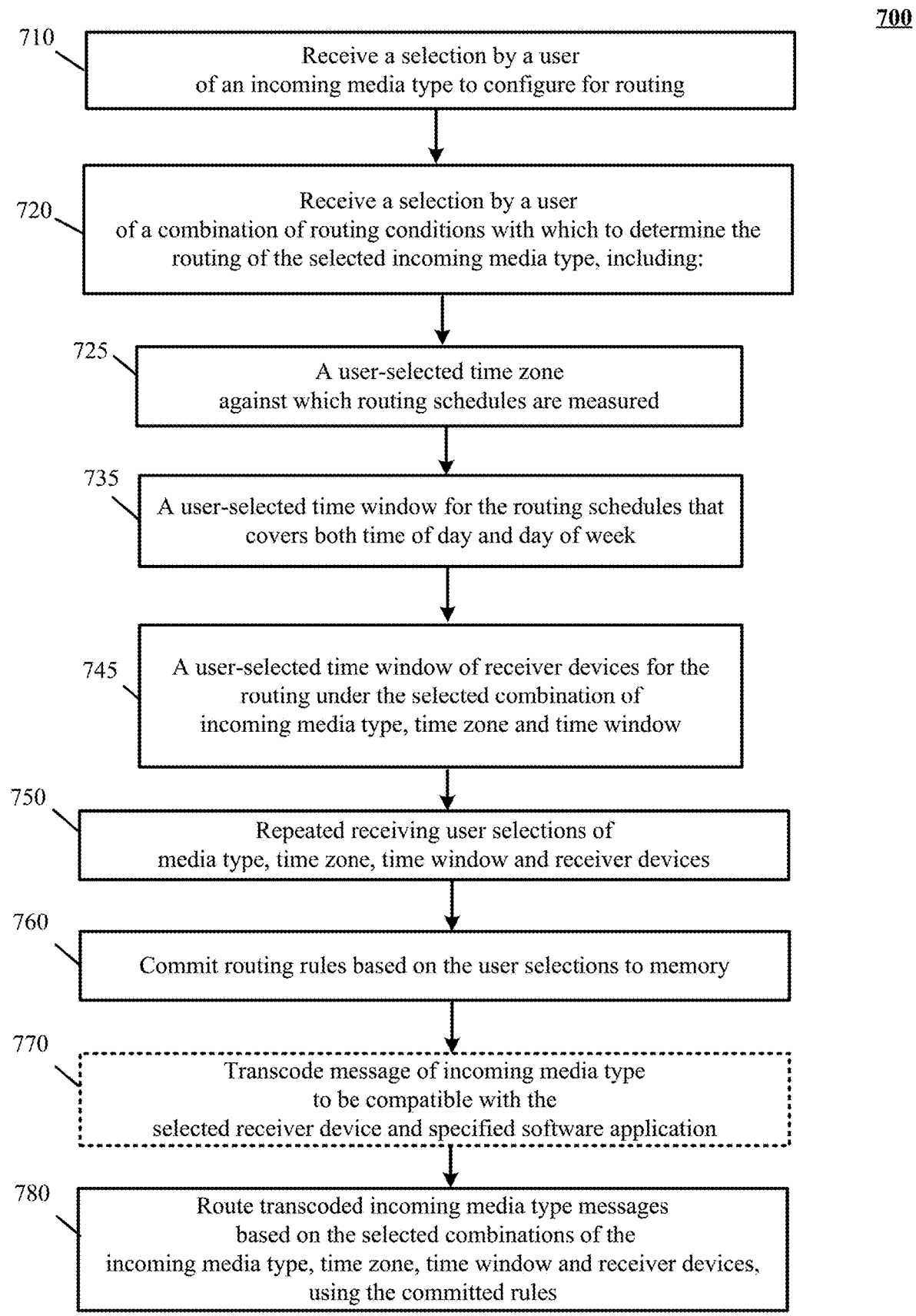
FIG. 7 shows one example workflow for configuring a transcoder router to direct communications to desired receivers.

FIG. 7 shows an example workflow 700 of one implementation for configuring a transcoder-router to direct incoming communications to desired receivers. Workflow 700 can be implemented at least partially with a database system, e.g., by one or more processors configured to receive or retrieve information, process the information, store results, and transmit the results. Other implementations may perform the steps in different orders and/or with different, fewer or additional steps than the ones illustrated in FIG. 7. Multiple steps can be combined in some implementations.

At action 710, receive a selection by a user from an icon-based GUI, of an incoming media type to configure for routing, for media types of voice, video, image, short message and email.

At action 720, receive a selection by a user of a combination of routing conditions with which to determine the routing of the selected incoming media type, in the context of the selected incoming media type, including the selections described at actions 725, 735 and 745 below, with which to determine the routing of the selected incoming media type.

At action 725, receive a user-selected time zone against which routing schedules are measured—as a selection by the user from a map-based GUI.

At action 735, receive a user-selected time window for the routing schedules that covers both time of day and day of week—as a selection by the user from a map-based GUI.

At action 745, receive a user-selected time window of receiver devices for the routing under the selected combination of incoming media type, time zone and time window—as a selection by the user from a map-based GUI.

At action 750, repeated receiving user selections of the incoming media type, time zone, time window and receiver devices.

At action 760, commit routing rules based on the user selections to tangible machine readable memory.

At action 770, optionally transcode a message of the incoming media type to be compatible with the selected receiver device and specified software application.

At action 780, route transcoded incoming media type messages based on the selected combinations of the incoming media type, time zone, time window and receiver devices, using the committed rules.

The actions described above can be subdivided into more steps or combined into fewer steps to carry out the method described using a different number or arrangement of steps.

Computer System

FIG. 8 is a block diagram of an example computer system 800. FIG. 8 is a block diagram of an example computer system, according to one implementation. The processor can be an ASIC or RISC processor. It can be an FPGA or other logic or gate array. It can include graphic processing unit (GPU) resources. Computer system 810 typically includes at least one processor 872 that communicates with a number of peripheral devices via bus subsystem 850. These peripheral devices may include a storage subsystem 826 including, for example, memory devices and a file storage subsystem, user interface input devices 838, user interface output devices 878, and a network interface subsystem 876. The input and output devices allow user interaction with computer system 810. Network interface subsystem 876 provides an interface to outside networks, including an interface to corresponding interface devices in other computer systems.

User interface input devices 838 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 810.

User interface output devices 878 may include a display subsystem, a printer, a fax machine, or non-visual displays such as audio output devices. The display subsystem may include a cathode ray tube (CRT), a flat-panel device such as a light emitting diode (LED) display, a projection device, or some other mechanism for creating a visible image. The display subsystem may also provide a non-visual display such as audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules and methods described herein. These software modules are generally executed by processor 872 alone or in combination with other processors.

Memory 822 used in the storage subsystem can include a number of memories including a main random access memory (RAM) 834 for storage of instructions and data during program execution and a read only memory (ROM) 832 in which fixed instructions are stored. A file storage subsystem 836 can provide persistent storage for program and data files, and may include a hard disk drive, a solid state disk drive, a floppy disk drive along with associated removable media, a CD-ROM drive, an optical drive, or removable media cartridges. The modules implementing the functionality of certain implementations may be stored by file storage subsystem 836 in the storage subsystem 826, or in other machines accessible by the processor.

Bus subsystem 850 provides a mechanism for letting the various components and subsystems of computer system 810 communicate with each other as intended. Although bus subsystem 850 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as one example. Many other configurations of computer system 810 are possible having more or fewer components than the computer system depicted in FIG. 8.

In some implementations, network(s) 145 can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

The technology disclosed can be implemented in the context of any computer-implemented system including a database system, a multi-tenant environment, or a relational database implementation like an ORACLE™ compatible database implementation, an IBM DB2 Enterprise Server compatible relational database implementation, a MySQL or PostgreSQL compatible relational database implementation or a Microsoft SQL Server compatible relational database implementation or a NoSQL non-relational database implementation such as a Vampire™ compatible non-relational database implementation, an Apache Cassandra™ compatible non-relational database implementation, a BigTable compatible non-relational database implementation or an HBase or DynamoDB compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Particular Implementations

In one implementation, a disclosed method of configuring a transcoder-router to direct incoming communications to desired receivers includes receiving a selection, by a user from an icon-based GUI, of an incoming media type to configure for routing, for incoming media types of voice, video, image, short message, and email. In context of the selected incoming media type, the method includes receiving a selection, by the user, of a combination of routing conditions with which to determine the routing of the selected incoming media type, including a selection, by the user from a map-based GUI, of a time zone against which routing schedules are measured; a selection, by the user from a clock and calendar-based GUI, of a time window for the routing schedules that covers both time of day and day of week; a selection, by the user from an icon-based GUI, of receiver devices for the routing under the selected combination of the incoming media type, time zone and time window. The disclosed method also includes repeated receiving user selections of the incoming media type, time zone, time window and receiver devices, and committing routing rules based on the user selections to tangible machine readable memory; and using the committed rules to route incoming media type messages based on the selected combinations of the incoming media type, time zone, time window and receiver devices.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features that implement staging and deployment launch.

Some implementations of the method further include checking new routing rules against prior routing rules for inconsistencies and generating a rule conflict message for any inconsistencies revealed by the checking. The method can further include transcoding a message of the incoming media type to be compatible with the selected receiver device. The disclose method can further include receiving a selection, by a user from a list of caller classes, of a caller class as a context for the combinations of the incoming media type, time zone, time window and receiver devices; and combining the selected caller class with the selected incoming media type as the context for processing the selection, by the user, of the combination of routing conditions. The list of caller classes available for user selection can include friends, business associates and unknown callers. Other implementations of the disclosed method can further include among the list of caller classes available for user selection, callers identified by lookup as prospects and callers identified by lookup as likely solicitors or telemarketers. Some implementations can also include among the incoming media types available for user selection another data type.

Some implementations of the disclosed method further include a user sub-selection, from a tool tip menu of the time zone GUI, of a specification that the selected time zone applies as home-default, during a scheduled interval, or when geolocation sensing matches the selected time zone. Included among the sub-selections available is a further specification that the selected time zone applies temporarily until canceled.

One implementation of the disclosed technology further includes receiving a user sub-selection, from a tool tip menu of the receiver device types GUI, of a specification of a particular account for the selected receiver device type to which the selected incoming media type are to be routed under the selected combination of conditions. In some implementations, the method also includes receiving a user sub-selection, from a tool tip menu of the receiver device types GUI, of a specification of a particular software application running on the selected receiver device to which the selected incoming media type are to be routed under the selected combination of conditions.

Some implementations of the disclosed method further include transcoding a message of the incoming media type to be compatible with the selected receiver device and the specified software application. In some implementations, the method also includes receiving, from the receiver device types GUI, a multi-select plurality of receiver devices that are all treated alike for routing of the selected incoming media type under the selected combination of conditions.

Other implementations of the method disclosed include receiving, from the time window GUI, a multi-select plurality of time windows that are all treated alike for routing of the selected incoming media type under the selected combination of conditions.

One implementation of a disclosed routing controller configuration method that directs incoming communications to desired receivers, includes a processor, memory coupled to the processor and program instructions in the memory that, when executed, cause the routing controller to perform a method that includes receiving a selection, by a user from an icon-based GUI, of an incoming media type to configure for routing, for incoming media types of voice, video, image, short message, and email. The method also includes, in context of the selected incoming media type, receiving a selection, by the user, of a combination of routing conditions with which to determine the routing of the selected incoming media type, including: a selection, by the user from a map-based GUI, of a time zone against which routing schedules are measured; a selection, by the user from a clock and calendar-based GUI, of a time window for the routing schedules that covers both time of day and day of week; and a selection, by the user from an icon-based GUI, of receiver devices for the routing under the selected combination of the incoming media type, time zone and time window. The disclosed method further includes repeated receiving of user selections of the incoming media type, time zone, time window and receiver devices, and committing routing rules based on the user selections to tangible machine readable memory; and using the committed rules to route incoming media type messages based on the selected combinations of the incoming media type, time zone, time window and receiver devices.

Yet another implementation may include a non-transitory computer readable memory and program instructions in the memory that, when executed by a routing controller, cause the routing controller to any of the methods described above or that are used to build any of the systems described herein. The tangible computer readable memory does not include transitory signals.

While the disclosed technology is disclosed by reference to the preferred embodiments and examples detailed above, it is to be understood of that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A computer-implemented method, comprising:
   receiving, by a transcoder-router, a media type selection that identifies at least one incoming media type for routing of at least one incoming message;
   receiving, by the transcoder-router, a device type selection that identifies at least one receiver device type for the routing of the at least one incoming message;
   receiving, by the transcoder-router, a time zone preference and a corresponding time window preference associated with the media type selection and the device type selection;
   committing, by the transcoder-router, at least one routing rule to memory based on a combination of the media type selection, the device type selection, the time zone preference, and the time window preference; and
   routing, by the transcoder-router, the at least one incoming message from a sender device to a receiver device enabled to receive the at least one incoming message based on the at least one routing rule.

2. The computer-implemented method of claim 1, wherein
   the at least one incoming media type includes a voice media type, a video media type, an image media type, a short message media type, and/or an email media type, and
   the at least one receiver device type includes a smart phone type, a tablet computer type, a laptop computer type, a desktop computer type, and/or a landline telephone type.

3. The computer-implemented method of claim 1, wherein
   the time window preference identifies at least one time window for enabling or disabling the routing of the at least one incoming message for the at least one incoming media type identified in the media type selection and the at least one device type identified by the device type selection, and
   the time zone preference identifies a time zone that the transcoder-router uses to determine when to enable or disable the routing of the at least one incoming message for the at least one time window identified by the time window preference.

4. The computer-implemented method of claim 1, wherein the routing of the at least one incoming message further comprises:
   receiving, by the transcoder-router, the at least one incoming message from the sender device, wherein each of the at least one incoming message is associated with an incoming media type; and
   determining, by the transcoder-router, the incoming media type associated with the at least one incoming message.

5. The computer-implemented method of claim 4, further comprising:
   transcoding, by the transcoder-router, the at least one incoming message having the associated incoming media type to a media type that is compatible with the receiver device; and
   sending, by the transcoder-router, the transcoded at least one incoming message to the receiver device that is enabled to receive the at least one incoming message.

6. The computer-implemented method of claim 1, further comprising:
   determining that an inconsistency exists between at least one previously committed routing rule and the at least one routing rule; and
   generating a rule conflict message based at least on the determination that the inconsistency exists between the at least one previously committed routing rule and the at least one routing rule.

7. The computer-implemented method of claim 1, wherein
   the media type selection and the device type selection are associated with a user having a user account, and
   the user account is associated with a user account name, a user account identifier, and a user account email.

8. A computing device, comprising:
   at least one processor; and
   a memory operatively coupled to the at least one processor, wherein the at least one processor is configured to perform operations comprising:
      receiving a media type selection that identifies at least one incoming media type for routing of at least one incoming message,
      receiving a device type selection that identifies at least one receiver device type for the routing of the at least one incoming message,
      receiving a time zone preference and a corresponding time window preference associated with the media type selection and the device type selection,
      committing at least one routing rule to memory based on a combination of the media type selection, the device type selection, the time zone preference, and/or the time window preference, and
      routing the at least one incoming message from a sender device to a receiver device enabled to receive the at least one incoming message based on the at least one routing rule.

9. The computing device of claim 8, wherein
   the at least one incoming media type includes a voice media type, a video media type, an image media type, a short message media type, and/or an email media type, and
   the at least one receiver device type includes a smart phone type, a tablet computer type, a laptop computer type, a desktop computer type, and/or a landline telephone type.

10. The computing device of claim 8, wherein
   the time window preference identifies at least one time window for enabling or disabling the routing of the at least one incoming message for the at least one incoming media type identified in the media type selection and the at least one device type identified by the device type selection, and
   the time zone preference identifies a time zone that the transcoder-router uses to determine when to enable or disable the routing of the at least one incoming message for the at least one time window identified by the time window preference.

11. The computing device of claim 8, wherein the routing of the at least one incoming message further comprises:
   receiving the at least one incoming message from the sender device, wherein each of the at least one incoming message is associated with an incoming media type, and
   determining the incoming media type associated with the at least one incoming message.

12. The computing device of claim 11, wherein the routing of the at least one incoming message further comprises:
   transcoding, by the transcoder-router, the at least one incoming message having the associated incoming media type to a media type that is compatible with the receiver device; and
   sending, by the transcoder-router, the transcoded at least one incoming message to the receiver device that is enabled to receive the at least one incoming message.

13. The computing device of claim 12, wherein the at least one processor is further configured to perform the operations comprising:
   determining that an inconsistency exists between at least one previously committed routing rule and the at least one routing rule, and
   generating a rule conflict message based at least on the determination that the inconsistency exists between the at least one previously committed routing rule and the at least one routing rule.

14. The computing device of claim 8, wherein
   the media type selection and the device type selection are associated with a user having a user account, and
   the user account is associated with a user account name, a user account identifier, and a user account email.

15. A tangible computer-readable device having instructions stored thereon that, when executed by a computing device, causes the computing device to perform operations comprising:
   receiving, by a transcoder-router, a media type selection that identifies at least one incoming media type for routing of at least one incoming message;
   receiving, by the transcoder-router, a device type selection that identifies at least one receiver device type for the routing of the at least one incoming message;
   receiving, by the transcoder-router, a time zone preference and a corresponding time window preference associated with the media type selection and the device type selection;
   committing, by the transcoder-router, at least one routing rule to memory based on a combination of the media type selection, the device type selection, the time zone preference, and the time window preference; and
   routing, by the transcoder-router, the at least one incoming message from a sender device to a receiver device enabled to receive the at least one incoming message based on the at least one routing rule.

16. The tangible computer-readable device of claim 15, wherein
   the at least one incoming media type includes a voice media type, a video media type, an image media type, a short message media type, and/or an email media type, and
   the at least one receiver device type includes a smart phone type, a tablet computer type, a laptop computer type, a desktop computer type, and/or a landline telephone type.

17. The tangible computer-readable device of claim 15, wherein
   the time window preference identifies at least one time window for enabling or disabling the routing of the at least one incoming message for the at least one incoming media type identified in the media type selection and the at least one device type identified by the device type selection, and
   the time zone preference identifies a time zone that the transcoder-router uses to determine when to enable or disable the routing of the at least one incoming message for the at least one time window identified by the time window preference.

18. The tangible computer-readable device of claim 15, wherein the operation for the routing of the at least one incoming message further comprises:
 receiving, by the transcoder-router, the at least one incoming message from the sender device, wherein each of the at least one incoming message is associated with an incoming media type; and
 determining, by the transcoder-router, the incoming media type associated with the at least one incoming message.

19. The tangible computer-readable device of claim 18, wherein the operation for the routing of the at least one incoming message further comprises:
 transcoding, by the transcoder-router, the at least one incoming message having the associated incoming media type to a media type that is compatible with the receiver device; and
 sending, by the transcoder-router, the transcoded at least one incoming message to the receiver device that is enabled to receive the at least one incoming message.

20. The tangible computer-readable device of claim 15, wherein the operations further comprises:
 determining that an inconsistency exists between at least one previously committed routing rule and the at least one routing rule; and
 generating a rule conflict message based at least on the determination that the inconsistency exists between the at least one previously committed routing rule and the at least one routing rule.

\* \* \* \* \*